United States Patent
Calloway et al.

(10) Patent No.: US 7,900,524 B2
(45) Date of Patent: Mar. 8, 2011

(54) MONITORING TOOLS

(75) Inventors: Tom Calloway, Dracut, MA (US); Dan Holmes, Boylston, MA (US); Eric Foxlin, Lexington, MA (US); Thomas C. Browne, North Andover, MA (US); Michael Donfrancesco, Westborough, MA (US); Dean Wormell, Westford, MA (US)

(73) Assignee: InterSense, Inc., Billerica, MA (US)

( * ) Notice: Subject to any disclaimer, the term of this patent is extended or adjusted under 35 U.S.C. 154(b) by 27 days.

(21) Appl. No.: 12/207,249

(22) Filed: Sep. 9, 2008

(65) Prior Publication Data
US 2010/0058901 A1    Mar. 11, 2010

(51) Int. Cl.
*G01L 5/24* (2006.01)
(52) U.S. Cl. ..................................... 73/862.22
(58) Field of Classification Search ........... 73/862.22, 73/862.23, 862.21, 761, 510; 81/469, 467
See application file for complete search history.

(56) References Cited

U.S. PATENT DOCUMENTS

| | | | | |
|---|---|---|---|---|
| 4,485,703 A | * | 12/1984 | Grabovac et al. | 81/483 |
| 4,987,806 A | * | 1/1991 | Lehnert | 81/469 |
| 5,467,656 A | | 11/1995 | Teare et al. | |
| 6,119,562 A | * | 9/2000 | Jenkins | 81/479 |
| 6,167,788 B1 | * | 1/2001 | Schonberger et al. | 81/467 |
| 6,405,598 B1 | * | 6/2002 | Bareggi | 73/761 |
| 6,698,298 B2 | * | 3/2004 | Tsuji et al. | 73/862.21 |
| 6,968,759 B2 | * | 11/2005 | Becker et al. | 81/479 |
| 6,981,416 B2 | * | 1/2006 | Chen et al. | 73/510 |
| 7,234,378 B2 | | 6/2007 | Reynertson, Jr. | |
| 7,331,246 B2 | | 2/2008 | Escoe et al. | |
| 2007/0265942 A1 | | 11/2007 | Freeman et al. | |
| 2008/0115589 A1 | | 5/2008 | DeRose et al. | |
| 2008/0287229 A1 | * | 11/2008 | Donahoe | 473/570 |

OTHER PUBLICATIONS

Tohnichi America Corporation. FH256MC Wireless Torque Verification System. 3 Pages. http://www.tohnichi.com/products/pro_FH256MC.asp.

Tohnichi America Corporation. Remote Signal Torque Wrench FH256MC Operation Manual. 11 Pages.

* cited by examiner

*Primary Examiner* — Jewel Thompson (74) *Attorney, Agent, or Firm* — Fish & Richardson P.C.

(57) ABSTRACT

Disclosed is a system for monitoring operation of a hand tool including an accelerometer coupled to the hand tool, a transmitter in data communication with the accelerometer, and a processor for receiving data from the transmitter and analyzing the data to detect an event associated with operation of the hand tool.

39 Claims, 4 Drawing Sheets

MONITORING TOOLS

BACKGROUND

This description relates to monitoring tools.

SUMMARY

Disclosed are methods and systems for monitoring tools.

In general, systems and methods for detecting events in an operation performed by a hand tool are disclosed. In some implementations, at least one accelerometer is fixed on the hand tool. Accelerometer data is transmitted real-time to a processor that analyzes the data and detects real-time events associated with successful and/or unsuccessful operation of the tool.

In one aspect, a system includes an accelerometer coupled to a hand tool, a transmitter in data communication with the accelerometer, and a processor for receiving data from the transmitter and analyzing the data to detect an event associated with operation of the hand tool.

The following are examples within the scope of this aspect.

The accelerometer includes a multi-axis accelerometer. The event includes a human operator error. The event includes an indication that the tool has been dropped. The event includes an indication that the operation of the hand tool is a repeat of a previous operation of the hand tool. The hand tool includes a torque wrench.

In another aspect the system includes a task completion component for monitoring successful tasks performed by the hand tool and comparing the number of successful tasks with an expected number of successful tasks. A true tool event signal is generated when the accelerometer produces at least two distinct spikes that define an interval substantially satisfying first predetermined criteria and have magnitudes substantially satisfying second predetermined criteria. The processor distinguishes the true tool event signal from other impulse signals by analyzing values of at least one of relative magnitude and timing of impulse-like signals from a plurality of sensors.

The following are examples within the scope of this aspect.

The hand tool is a click-type torque wrench, and the true tool event signal is generated by a click produced by the wrench when a predetermined torque level is reached. The processor, based on a measure of angular rotation preceding the click produced by the wrench, determines if the click is caused by a bolt that has previously been tightened. The system includes an angular rate sensor.

A signal from the angular rate sensor substantially satisfies third predetermined criteria during at least one of time intervals before, during and after the two spikes. The system includes an integration component for, prior to detection of an event, integrating an angular motion of the tool. The system includes a position measurement component for measuring a degree of freedom of a position of the tool during the event. The processor verifies the operation by comparing a measured position of the tool with an expected position of the tool. The processor verifies that events associated with operation of the hand tool take place in a predetermined sequence and at predetermined locations.

In another aspect, a method of monitoring operation of a hand tool includes by an accelerometer, sensing the operation of the hand tool, generating data based on the sensing, and analyzing the data to detect an event associated with operation of the hand tool.

The following are examples within the scope of this aspect.

The method includes transmitting the data from the hand tool at one location to a processor for the analyzing at another location. The analyzing is carried out at the hand tool. The event includes a human operator error. The event includes an indication that the tool has been dropped. The event includes an indication that the operation of the hand tool is a repeat of a previous operation of the hand tool. The hand tool includes a torque wrench.

The method includes monitoring successful tasks performed by the hand tool and comparing the number of successful tasks with an expected number of successful tasks. The method includes distinguishing a true tool event signal from other impulse signals by analyzing values of at least one of relative magnitude and timing of impulse-like signals from a plurality of sensors. The true tool event signal is generated when the sensor produces at least two distinct spikes that define an interval substantially satisfying first predetermined criteria and have magnitudes substantially satisfying second predetermined criteria.

The hand tool is a click-type torque wrench, and the true tool event signal is generated by a click produced by the wrench when a predetermined torque level is reached. The method includes, based on a measure of angular rotation preceding the click produced by the wrench, determining if the click is caused by a bolt that has previously been tightened. The method includes measuring a degree of freedom of a position of the tool substantially during the event. The method includes verifying the operation of the hand tool by comparing a measured position of the tool with an expected position of the tool. The method includes verifying that events associated with operation of the hand tool take place in a predetermined sequence and at predetermined locations.

In another aspect, a computer readable medium includes instructions to produce data based on sensing, by an accelerometer, an operation of a hand tool, and analyze the data to detect an event associated with operation of the hand tool.

The following are examples within the scope of this aspect.

The medium includes instructions to transmit the data from the hand tool at one location to a processor for the analyzing at another location. The analyzing is carried out at the hand tool. The event includes a human operator error. The event includes an indication that the tool has been dropped. The event includes an indication that the operation of the hand tool is a repeat of a previous operation of the hand tool. The hand tool includes a torque wrench.

Other aspects and features and combinations of them can be expressed as methods, apparatus, systems, program products, means for performing functions, and in other ways.

Some advantages include the following. Monitoring tools through event detection allows better control and monitoring of systems that include non-automated tools. For example, the ability to better control hand tools used in mechanical assembly systems can improve the quality and efficiency of building, disassembling, and maintaining mechanical assemblies.

Other advantages and features will become apparent from the following description and claims.

DESCRIPTION

Figure 1:
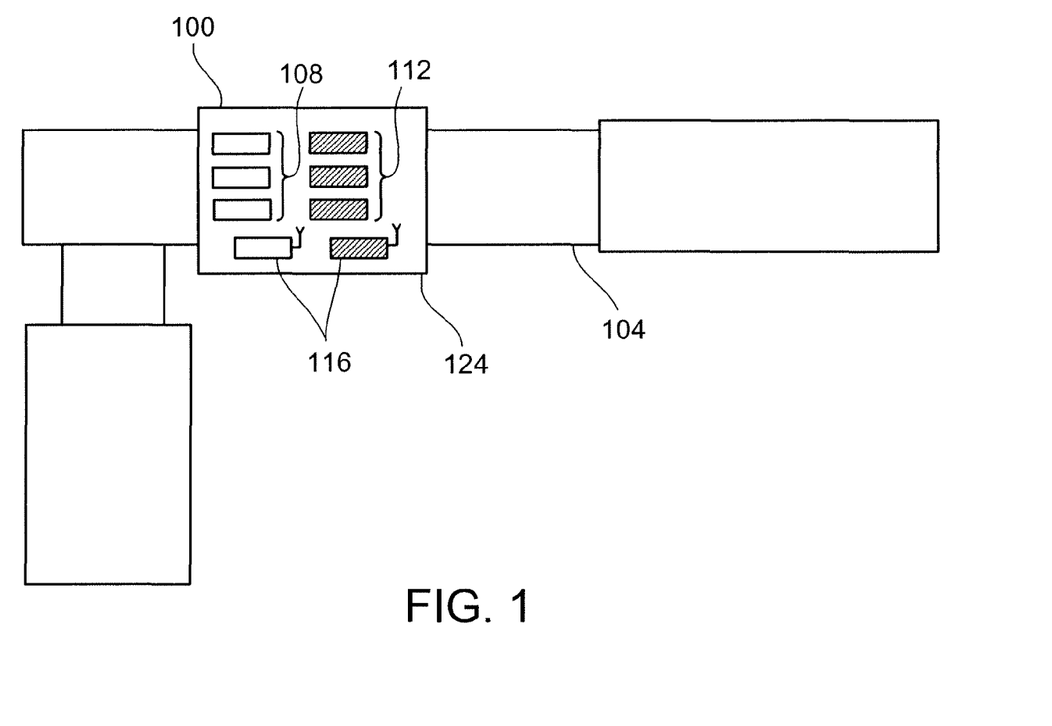
FIG. 1 is a block diagram of an example tool monitoring system.

Referring to FIG. 1, an example monitoring system 100 for monitoring a hand tool 104 is shown. The system 100 includes sensors, e.g., accelerometers 108 and angular rate sensors (e.g., gyroscopes 112), and transmitters 116. The accelerometers 108 can include multi-axis accelerometers, e.g., 6-axis inertial sensors. In some examples, the accelerometers 108, gyroscopes 112 and transmitters 116 are mechanically coupled to the hand tool 104. The hand tool 104 can be any non-automated tool that is manually handled by a worker. For example, the hand tool 104 can be a torque wrench for tightening or loosening a bolt. In some examples, the hand tool 104 is a "click type" torque wrench.

Figure 2:
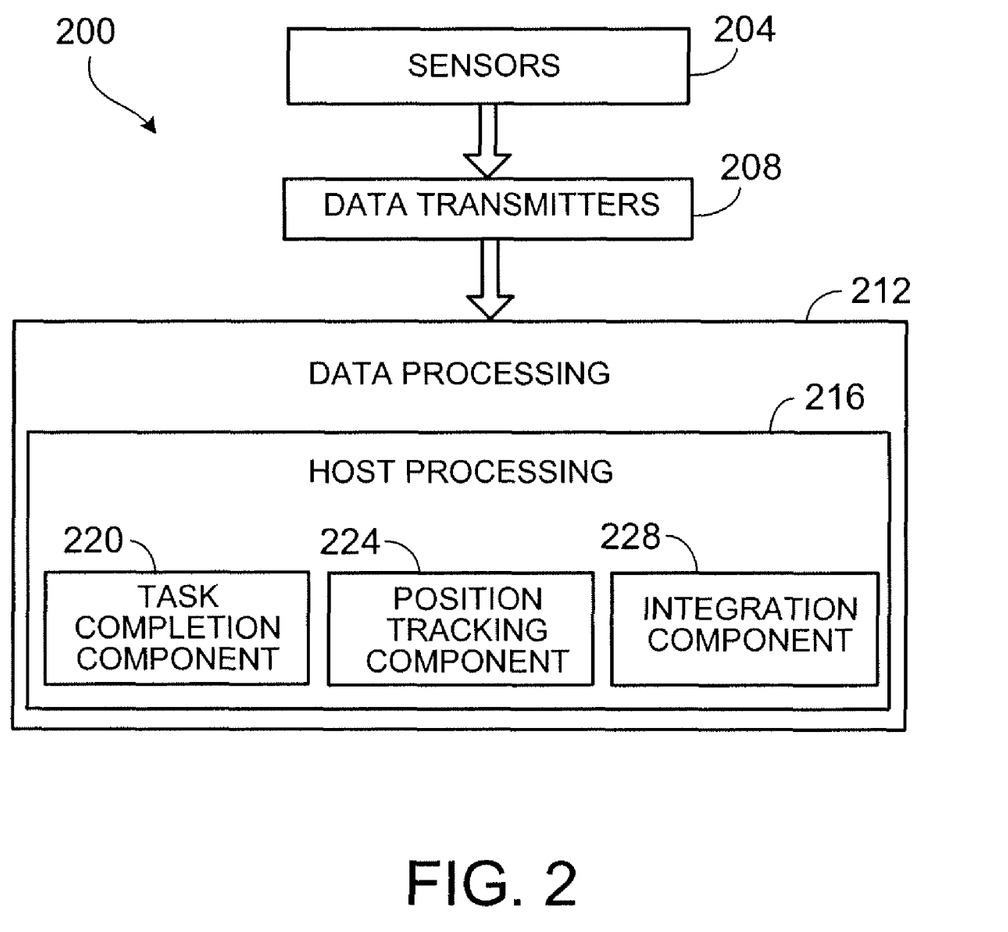
FIG. 2 is an example tool monitoring flow diagram.

In some implementations, the accelerometers 108 and gyroscopes 112 are attached to the hand tool 104 on three axis, i.e., yaw, pitch and roll. The system 100 processes raw data generated by the accelerometers 108 and gyroscopes 112 and transmits the data to a receiver, e.g., a host processor (FIG. 2). In some examples, the raw data from the accelerometers 108 and gyroscopes 112 are processed at the receiver.

The system 100 detects events in an operation of the hand tool 104 and transmits data associated with the events for processing at the receiver. For example, in a "click type" torque wrench, the system 100 detects the occurrence of a "click" during operation of the torque wrench. The transmitters 116 transmit data associated with the click event to the receiver. In some examples, the system 100 can detect not only whether or not a click occurred, but how far a bolt was turned prior to the click.

In some examples, the events associated with operation of the hand tool 104 can include a human operator error, such as, improper use of the hand tool. For example, the human operator may accidentally over tighten a bolt. In some examples, the events associated with operation of the hand tool 104 can include an indication that the tool has been dropped.

In some examples, the event can include an indication that the operator is repeating an operation at for example, a same location at which the operation was already performed. In such situations, based on the information associated with the indication, an alert can be sent to inform the operator.

In some implementations, the system 100 is enclosed in a hardened plastic or metallic shell 124 that is clamped onto the shaft of the hand tool 104. In some examples, the system 100 is an independent and distinct unit that is separable from the hand tool 104. As such, the system 100 can be independently attached to the hand tool 104 when it is necessary to track the operation of the hand tool 104. For example, in one implementation using a typical torque wrench that has a rivet already disposed near the head of the wrench, the rivet can be used to provide a means for mounting the system 100.

In some implementations, the system 100 is substantially integrated with the hand tool 104, i.e., the system 100 is not separable from the hand tool 104.

The accelerometers 108 and gyroscopes 112 are substantially fixed to the hand tool 104 such that they do not move relative to the hand tool 104 during operation.

The transmitters 116 can transmit the data to receivers over either wired or wireless connections. In some examples, the transmitter 116 has a data sampling rate of at least 180 Hz.

Referring to FIG. 2, an example tool monitoring flow diagram 200 is shown. Raw sensor data, i.e., data from the accelerometers 108 and the gyroscopes 112, is processed by analog to digital converters, and at least one processor, e.g., a small scale programmable integrated circuit, or a microprocessor (not shown). (Step 204) The digital data is transmitted to a processor, e.g., host processor 216. (Step 208) The host processor 216 analyzes the digital data to detect events in accordance with a set of predetermined criteria as described in detail below (Step 216). The host processor 216 can include a desktop or laptop computer. In some examples, the host processor 216 can be a programmable integrated circuit for receiving and analyzing the digital data.

In some examples, the host processor 216 is on a separate system at a remote location. In some examples, the host processor 216 is implemented at the tool 104 itself. One advantage of analyzing the digital data at the tool 104 is to secure high and reliable data rates by eliminating the need for transmitting the data to a remote location.

In some examples, the host processor 216 includes a task completion component 220, a position tracking component 224, and an integration component 228. In some examples, the task completion component 220, the position tracking component 224, and the integration component 228 are separate and distinct from the host processor 216. Task completion component 220, position tracking component 224 and integration component 228 may be implemented in hardware or software. In some examples, these components can reside at different locations. In some examples, the task completion component 220, the position tracking component 224, and the integration component 228 can be included in the system 100 at the hand tool 104.

The task completion component 220 analyzes the digital data received from the transmitters 116 to compare a number of successful tasks performed during the operation (e.g., tasks during which no adverse event is reported) with an expected number of successful tasks. In some examples, the host processor 216 can be configured to generate an alert or compile a report based on the comparison.

The position tracking component 224 is implemented to track a position of the hand tool 104 during an operation. Accordingly, the host processor 216 can verify successful completion of a job operation involving several locations at a job site. For example, in a job that involves multiple bolts located at different locations, the position tracking component 224 can be used to ensure that the operator has tightened all the bolts.

In some examples, the host processor 216 can also verify whether the events associated with an operation of the hand tool 104 have taken place in a predetermined sequence and at predetermined locations. For example, the host processor 216 can review the digital data to determine if a sequence of events match an expected sequence of events. In some examples, if the sequence of events do not match the expected sequence of events, the host processor 216 can generate an alert or log the information for later review.

The integration component 228 is implemented to integrate values of rotation measured by the gyroscopes 112. The integration component 228 provides an indication of a distance measured in, for example, degrees, that a bolt has been tightened prior to reaching torque during an operation. Accordingly, if no rotation is detected, then the bolt was simply re-tightened. If rotation that exceeds a predetermined threshold is measured, then the bolt was tightened and torqued during the operation.

As described above, the exemplary system 100 includes accelerometers 108 and gyroscopes 112 on at least three axes of rotation and translation. For example, the system 100 can include accelerometers 108 and gyroscopes 112 along an axis of the hand tool 104 as the x-axis, and also along each of the y- and z-axes. The total magnitude of the signals from the accelerometers 108 and individual amplitudes of signals from the gyroscopes 112 (x, y, and z-axes) are analyzed in real-time to detect when and whether the tool 104, i.e., a torque wrench, was used to torque, for example, a fastener.

Figure 3:
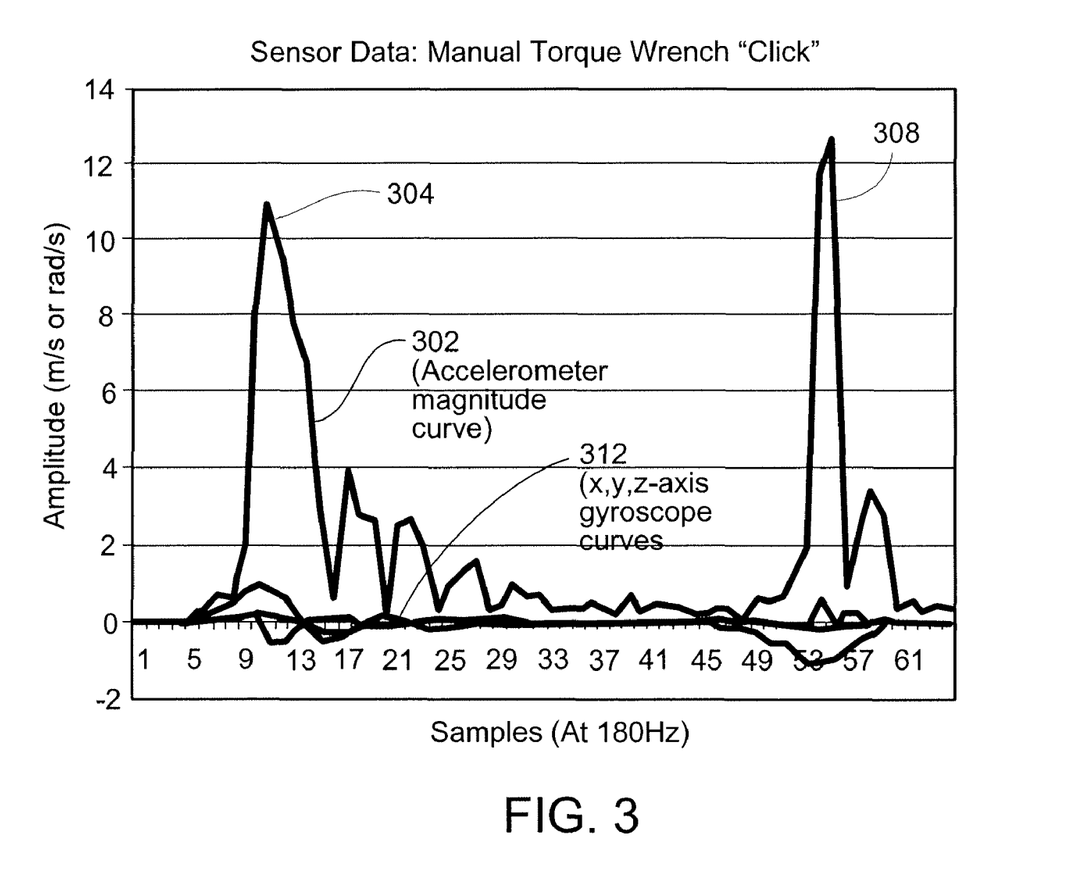
FIG. 3 is a graph showing sensor data.

FIG. 3 is a graph showing sensor data over a 0.3 second period corresponding to a true tool event, e.g., a "click" event of the torque wrench. Data characteristics that correspond to the click event are distinguishable from data characteristics that correspond to when the wrench is simply moved, bumped, or dropped. Data characteristics for this purpose can include, for example, values of relative magnitude and timing of impulse-like signals that are detected in the data. In this manner, the system 100 is able to distinguish between a true tool event signal and other impulse signals.

Curve 302 represents the total magnitude of the signals from the accelerators 108. During the click of the torque wrench, the curve 302 have a characteristic behavior is distinguishable from the behavior of the curve 302 at all other times outside the 0.3 second interval. As shown, during this interval, the curve 302 has two spikes 304 and 308. Similarly, the three curves 312 corresponding to the amplitudes of signals from the x, y, and z gyroscopes 112 also take on characteristic values during a click of a torque wrench.

These characteristic values, i.e., parameters, form a basis for selecting predetermined criteria values for analyzing data associated with operation of the wrench.

Table 1 lists example predetermined criteria parameters for a typical click event of the torque wrench.

TABLE 1

Example predetermined criteria parameters for a manual torque wrench "Click."

| TORQUE DETECTION PARAMETER | TYPICAL VALUE | UNITS |
| --- | --- | --- |
| Gyroscope 1$^{st}$ Spike Response | 1.0 | rad/s |
| Gyroscope 2$^{nd}$ Spike Response | −1.0 | rad/s |
| Gyroscope Min Pre-rotation | 0-90 | Degrees |
| Gyroscope Max Amplitude | 7.0 | rad/s |
| Gyroscope Noise Floor | 0.1 | rad/s |
| Z Gyroscope Relative Amplitude | 1.2 | Multiplier |
| Accelerometer Min Spike Amplitude | 5.0 | m/s$^2$ |
| Accelerometer Noise Floor | 2.0 | m/s$^2$ |
| Accelerometer Noise Nominal | 3.5 | m/s$^2$ |
| Accelerometer Max Spike Spacing | 1.0 | Seconds |
| Accelerometer Min Spike Spacing | 0.1 | Seconds |
| Accelerometer Settling Time | 0.08 | Seconds |
| Tool Click Window | 4.0 | Seconds |

The "Gyroscope 1st Spike Response" parameter is a response of the gyroscope 112 along the axis of rotation of the torque wrench at the time of the first spike 304 in the accelerometer magnitude curve 302. The response is typically greater than the value selected.

The "Gyroscope 2nd Spike Response" parameter is a response of the gyroscope 112 along the axis of rotation of the torque wrench at the time of the second spike in accelerometer data 308. The response is typically less than the value selected.

The "Gyroscope Min Pre-Rotation" parameter refers to an amount of rotation required prior to detection of a torque event. Setting this value to zero will typically not require any pre-rotation.

The "Gyroscope Max Amplitude" parameter is a maximum acceptable rotation rate allowed during a torque event.

The "Gyroscope Noise Floor" parameter is a maximum output of the gyroscopes 112 in between the spikes 304 and 308.

The "Z Gyroscope Relative Amplitude" parameter is a ratio of the rotation measured by a predicted axis of rotation and a maximum of the rotation detected on another axis.

The "Accelerometer Min Spike Amplitude" parameter is a minimum allowable acceleration to be considered a spike.

The "Accelerometer Noise Floor" parameter is an acceptable acceleration detected in between the spikes 304 and 308 when they are settled.

The "Accelerometer Noise Nominal" parameter is an acceptable acceleration detected in between the spikes 304 and 308 while they are still settling.

The "Accelerometer Max Spike Spacing" parameter is a maximum amount of time allowed in between the spikes 304 and 308.

The "Accelerometer Min Spike Spacing" parameter is a minimum amount of time allowed in between the spikes 304 and 308.

The "Accelerometer Settling Time" parameter is a maximum amount of time that it could take for the accelerometers to settle after a spike, e.g., spike 304.

The "Tool Click Window" parameter specifies an amount of time to store data for analysis before considering the data unusable. A data buffer (not shown) is typically fed the latest data, and any data older than the "Tool Click Window" is typically discarded.

Figure 4:
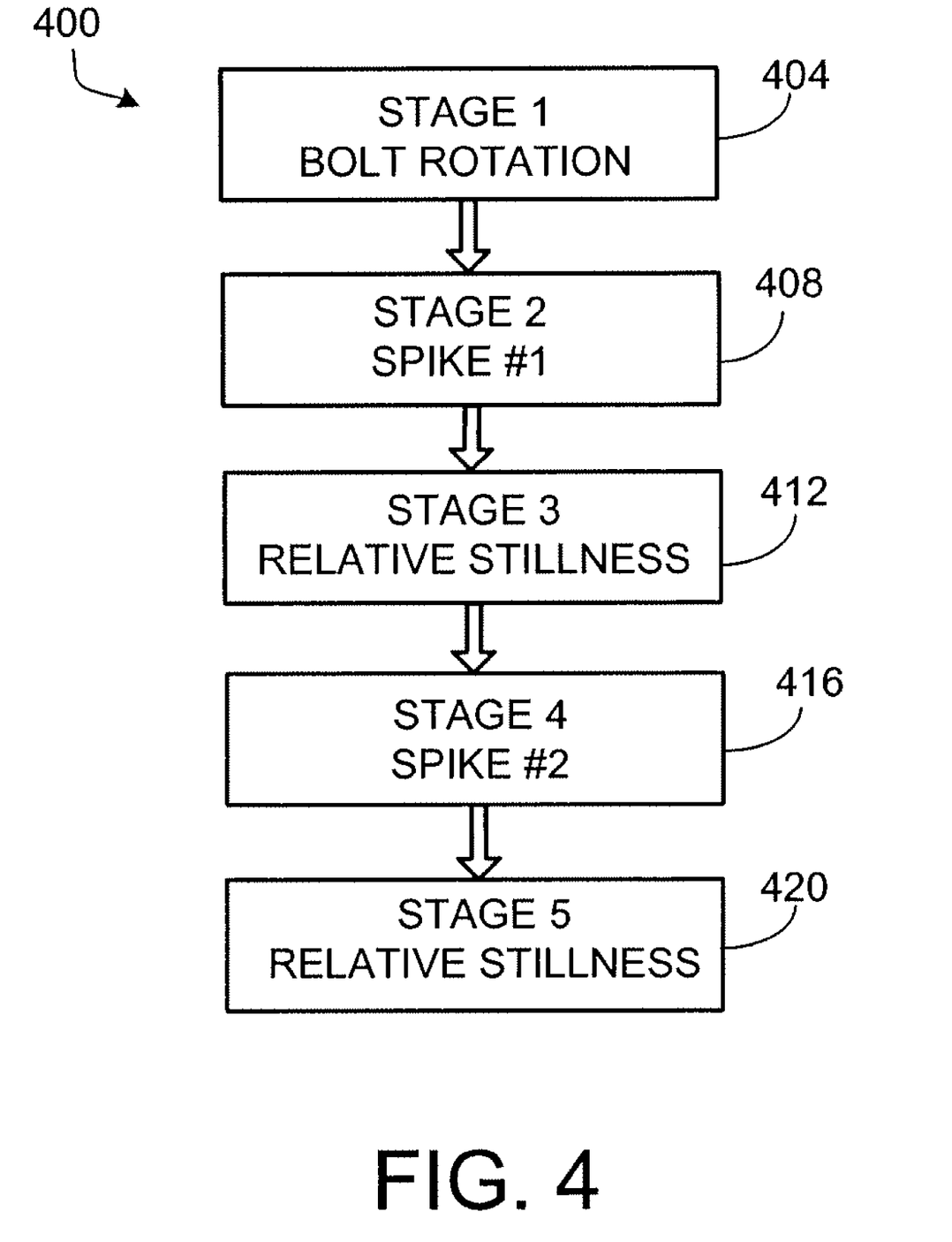
FIG. 4 is an example flow diagram for a click of a torque wrench.

FIG. 4 is an example flow diagram 400 of a succession of events during a torque event associated with the torque wrench. As shown, the duration of the torque event is divided in to five stages. At each stage, a set of predetermined criteria parameters are provided. The host processor 216 implements the flow diagram 400 (algorithm 400) that moves through the data generated by the sensors 108, 112 as for example, an array of floating point values, and searches for conditions corresponding to the predetermined criteria parameters. As the conditions for each stage are met, the algorithm 400 progresses to the next stage. If at any time, conditions corresponding to the predetermined criteria parameters for a given stage are not met, the algorithm 400 returns to the first stage of detection.

If substantially all of the predetermined criteria parameters are satisfied at each of the stages, then a click event of the torque wrench is deemed to have been detected by the system 100. The predetermined criteria for detection are designed and tuned to detect actual click events and minimize false positives.

During stage 1 of a torque event, an operator tightens a bolt to its maximum pre-torqued tightness. In this stage, the algorithm 400 measures the values of the signals from the sensors 108 and 112 and compares these values with the predetermined criteria values of "Gyroscope Noise Floor," "Accelerometer Noise Nominal," and "Accelerometer Settling Time" in Table 1. If, for example, the signal from the accelerometers 108 remain below the "Accelerometer Noise Nominal" parameter of Table 1, and the signals from the gyroscopes 112 remain below the "Gyroscope Noise Floor" parameter for at least a time interval indicated by the "Accelerometer Settling Time" parameter, then the predetermined criteria for stage 1 is deemed to have been satisfied and the algorithm moves on to stage 2.

In stage 2, the desired torque setting is reached and the wrench clicks suddenly as it rapidly releases its tensions and swings several degrees around the axis of bolt rotation. If the accelerometer spike is high enough and the response of the gyroscope is appropriate, i.e., the measured values of the signals from the accelerometers 108 and gyroscopes 112 meet the requirements of the "Accelerometer Min Spike Amplitude," "Gyroscope 1st Spike Response," "Gyroscope Max Amplitude," and "Gyroscope Relative Amplitude," parameters set in the predetermined criteria of Table 1, then the algorithm 400 proceeds to stage 3.

For example, to meet the predetermined criteria set in Table 1, a measured values of the signal from the accelerometers 108 must be above the "Accelerometer Min Spike Amplitude," a measured value of the signals from the gyroscopes 112 must be below the "Gyroscope Max Amplitude," and a measured ratio of values of signals from the gyroscopes 112 must be above the "Gyroscope Relative Amplitude." Finally, in some implementations, a measured value of the signal from the gyroscope 112 along the axis of rotation of the wrench must be greater than the "Gyroscope 1st Spike Response" parameter.

During stage 3, the wrench comes to a stop and a mechanical recoil force is applied by the wrench in a direction that is opposite that of the initial rotation. Before the wrench swings back, there is an interval of time, i.e., an interval of time defined by the parameters of "Accelerometer Min Spike Spacing" and "Accelerometer Max Spike Spacing," during which the sensors are still, i.e., values of signals from the sensors 108 and 112 meet the predetermined criteria parameters of "Gyroscope Noise Floor," "Accelerometer Noise Nominal," and "Accelerometer Settling Time" of Table 1.

For example, the time between spikes measured from the accelerometers 108 must be greater than the "Accelerometer Min Spike Spacing" and less than the "Accelerometer Max Spike Spacing". Measured values of signals from the accelerometers 108 must also be below the "Accelerometer Noise Nominal" at a distance of "Accelerometer Settling Time" after the first spike 304. Finally, the measured values of signals from the gyroscopes 112 must be less than the "Gyroscope Noise Floor". If these conditions are deemed to have been met, then algorithm 400 proceeds to stage 4.

In Stage 4, the wrench swings back to a point at which the bolt reached a predetermined torque level and snaps to a sudden stop. If the value of the signal from the accelerometer 108 is deemed to be above the "Accelerometer Min Spike Amplitude" parameter, the value of the signal from the gyroscope 112 along the axis of rotation of the wrench is deemed to be less than the "Gyroscope 2nd Spike Response" parameter, the value of the signal from the gyroscope 112 is deemed to be below the "Gyroscope Max Amplitude" and above the "Gyroscope Relative Amplitude," then the conditions of stage 4 are deemed to be met, and the algorithm proceeds to stage 5.

Stage 5 is the final stage in which the sensor data becomes stable once again. If the sensors are relatively still, i.e., measured values of signals of the sensors 108 and 112 meet the requirements set by predetermined criteria parameters of "Gyroscope Noise Floor," "Accelerometer Noise Nominal," "Accelerometer Settling Time" of Table 1, then the final conditions are deemed to have been met and the algorithm 400 reports a successful torque event. For example, measured values of signals from the gyroscopes 112 must be below the "Gyroscope Noise Floor" parameter, and measured values of signals from the accelerometer 108 must be below the "Accelerometer Noise Nominal" at a time after that indicated by the "Accelerometer Settling Time" parameter.

In some examples, at this point, the algorithm 400 goes back over the data to compute how far a bolt was turned prior to torque or whether it was tightened at all by using e.g., the "Gyroscope Min Pre-Rotation" value. One use of this value is to ascertain whether an operator is, for example, tightening a bolt that has already been tightened.

In some examples, a measure of cross-axis rotation during the torque event is obtained to ensure that tightening was done properly, i.e., the "Z Gyroscope Relative Amplitude." The higher the measured value corresponding to the "Z Gyroscope Relative Amplitude" parameter, the cleaner the event, i.e., the measured values corresponding to the torque event are substantially closer to the predetermined criteria parameters. For example, when a bolt is torqued, the torque is expected to be applied around the axis in which the bolt has been tightened. Any significant rotation along another axis during the time of the torque event indicates improper use of the tool. If the measured value of "Z Gyroscope Relative Amplitude" is less than the configured "Z Gyroscope Relative Amplitude" parameter, then no torque event will be detected.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

Other embodiments are within the scope of the following claims and other claims to which the applicant may be entitled. The following are examples for illustration only and do not limit the alternatives in any way. The techniques described herein can be performed in a different order and still achieve desirable results Other implementations are within the scope of the following claims and other claims to which the applicant may be entitled.

What is claimed is:

1. A system comprising:
   an accelerometer coupled to a hand tool,
   and
   a processor for receiving data from the accelerometer and analyzing the data to detect an event associated with operation of the hand tool, wherein detecting the event comprises at least one of: detecting human operator error, detecting that the tool has been dropped, detecting that an operation of the hand tool is a repeat of a previous operation of the hand tool, or detecting a click.

2. The system of claim 1 in which the accelerometer includes a multi-axis accelerometer.

3. The system of claim 1 in which detecting the event includes detecting human operator error.

4. The system of claim 1 in which detecting the event includes detecting that the tool has been dropped.

5. The system of claim 1 in which detecting the event includes detecting that an operation of the hand tool is a repeat of a previous operation of the hand tool.

6. The system of claim 1 in which the hand tool includes a torque wrench.

7. The system of claim 1 comprising a task completion component for monitoring successful tasks performed by the hand tool and comparing the number of successful tasks with an expected number of successful tasks.

8. The system of claim 1 in which the hand tool is a click-type torque wrench, and wherein detecting the event includes detecting a click produced by the wrench when a predetermined torque level is reached.

9. The system of claim 8 in which the processor detects an event by analyzing values of at least one of relative magnitude and timing of impulse-like signals from a plurality of sensors.

10. The system of claim 8 in which analyzing the data to detect an event comprises determining when the accelerometer produces at least two distinct spikes that define an interval substantially satisfying first predetermined criteria and have magnitudes substantially satisfying second predetermined criteria.

11. The system of claim 10 comprising an angular rate sensor.

12. The system of claim 11 in which the processor, based on a measure of angular rotation preceding the click produced by the wrench, determines if the click is caused by tightening of a bolt that has previously been tightened.

13. The system of claim 11 in which, to determine whether the event has occurred, the processor compares a signal from the angular rate sensor with third predetermined criteria during at least one of time intervals before, during and after the two spikes.

14. The system of claim 1 comprising an integration component for integrating an angular motion of the tool.

15. The system of claim 1 comprising a position measurement component for measuring a location of the tool during the event.

16. The system of claim 1 in which the processor verifies proper operation of the hand tool by comparing a measured location of the tool with an expected location of the tool.

17. The system of claim 15 in which the processor verifies that events associated with operation of the hand tool take place in a predetermined sequence and at predetermined locations.

18. A method of monitoring operation of a hand tool, comprising:
   by an accelerometer, sensing the operation of the hand tool, generating data based on the sensing, and
   analyzing the data to detect an event associated with operation of the hand, wherein detecting the event comprises at least one of: detecting human operator error, detecting that the tool has been dropped, detecting that an operation of the hand tool is a repeat of a previous operation of the hand tool, or detecting a click.

19. The method of claim 18 further comprising transmitting the data from the hand tool at one location to a processor for the analyzing at another location.

20. The method of claim 18 in which the analyzing is carried out at the hand tool.

21. The method of claim 18 in which detecting the event includes detecting human operator error.

22. The method of claim 18 in which detecting the event includes detecting that the tool has been dropped.

23. The method of claim 18 in which detecting the event includes detecting that an operation of the hand tool is a repeat of a previous operation of the hand tool.

24. The method of claim 18 in which the hand tool includes a torque wrench.

25. The method of claim 18 further comprising monitoring successful tasks performed by the hand tool and comparing the number of successful tasks with an expected number of successful tasks.

26. The method of claim 18 further comprising detecting an event by analyzing values of at least one of relative magnitude and timing of impulse-like signals from a plurality of sensors.

27. The method of claim 26 in which analyzing the data to detect an event comprises determining when the accelerometer produces at least two distinct spikes that define an interval substantially satisfying first predetermined criteria and have magnitudes substantially satisfying second predetermined criteria.

28. The method of claim 18 in which the hand tool is a click-type torque wrench, and detecting the event includes detecting a click produced by the wrench when a predetermined torque level is reached.

29. The method of claim 28 further comprising, based on a measure of angular rotation preceding the click produced by the wrench, determining if the click is caused by a bolt that has previously been tightened.

30. The method of claim 18 further comprising measuring a location of the tool substantially during the event.

31. The method of claim 18 further comprising verifying the operation of the hand tool by comparing a measured location of the tool with an expected location of the tool.

32. The method of claim 18 further comprising verifying that events associated with operation of the hand tool take place in a predetermined sequence and at predetermined locations.

33. A computer readable medium comprising instructions to:
produce data based on sensing, by an accelerometer, an operation of a hand tool, and
analyze the data to detect an event associated with operation of the hand tool, wherein detecting the event comprises at least one of: detecting human operator error, detecting that the tool has been dropped, detecting that an operation of the hand tool is a repeat of a previous operation of the hand tool, or detecting a click.

34. The medium of claim 33 further comprising instructions to transmit the data from the hand tool at one location to a processor for the analyzing at another location.

35. The medium of claim 33 in which the analyzing is carried out at the hand tool.

36. The medium of claim 33 in which detecting the event includes detecting human operator error.

37. The medium of claim 33 in which detecting the event includes detecting that the tool has been dropped.

38. The medium of claim 33 in which detecting the event includes detecting that an operation of the hand tool is a repeat of a previous operation of the hand tool.

39. The medium of claim 33 in which the hand tool includes a torque wrench.

* * * * *